United States Patent
Shappell et al.

(10) Patent No.: US 6,845,613 B2
(45) Date of Patent: Jan. 25, 2005

(54) LAST CHANCE AIRCRAFT BACK-UP HYDRAULIC SYSTEM

(75) Inventors: Paul E. Shappell, Elkton, MD (US); Richard H. Janiesch, Hauppauge, NY (US)

(73) Assignee: The Boeing Company, Chicago, IL (US)

(*) Notice: Subject to any disclaimer, the term of this patent is extended or adjusted under 35 U.S.C. 154(b) by 556 days.

(21) Appl. No.: 09/990,639

(22) Filed: Nov. 21, 2001

(65) Prior Publication Data
US 2003/0094540 A1 May 22, 2003

(51) Int. Cl.$^7$ ................................. B62D 5/30
(52) U.S. Cl. ..................................... 60/405
(58) Field of Search .............. 60/403, 405; 244/73 R

(56) References Cited

U.S. PATENT DOCUMENTS 4,190,130 A * 2/1980 Beck ..................... 60/405

* cited by examiner

Primary Examiner—Thomas E. Lazo
(74) Attorney, Agent, or Firm—Shimokaji & Associates, P.C.

(57) ABSTRACT

A last chance aircraft back-up hydraulic system in which fuel from the fuel tanks of the aircraft is injected into the return line of a leaking hydraulic system by use of a pump activated by a guarded switch by the aircraft's pilot. The fuel serves as hydraulic fluid to operate the pumps of the system as it is injected upstream from the fluid being lost to extend the operating time of the system and prevent failure so the aircraft can be landed at a site.

11 Claims, 1 Drawing Sheet

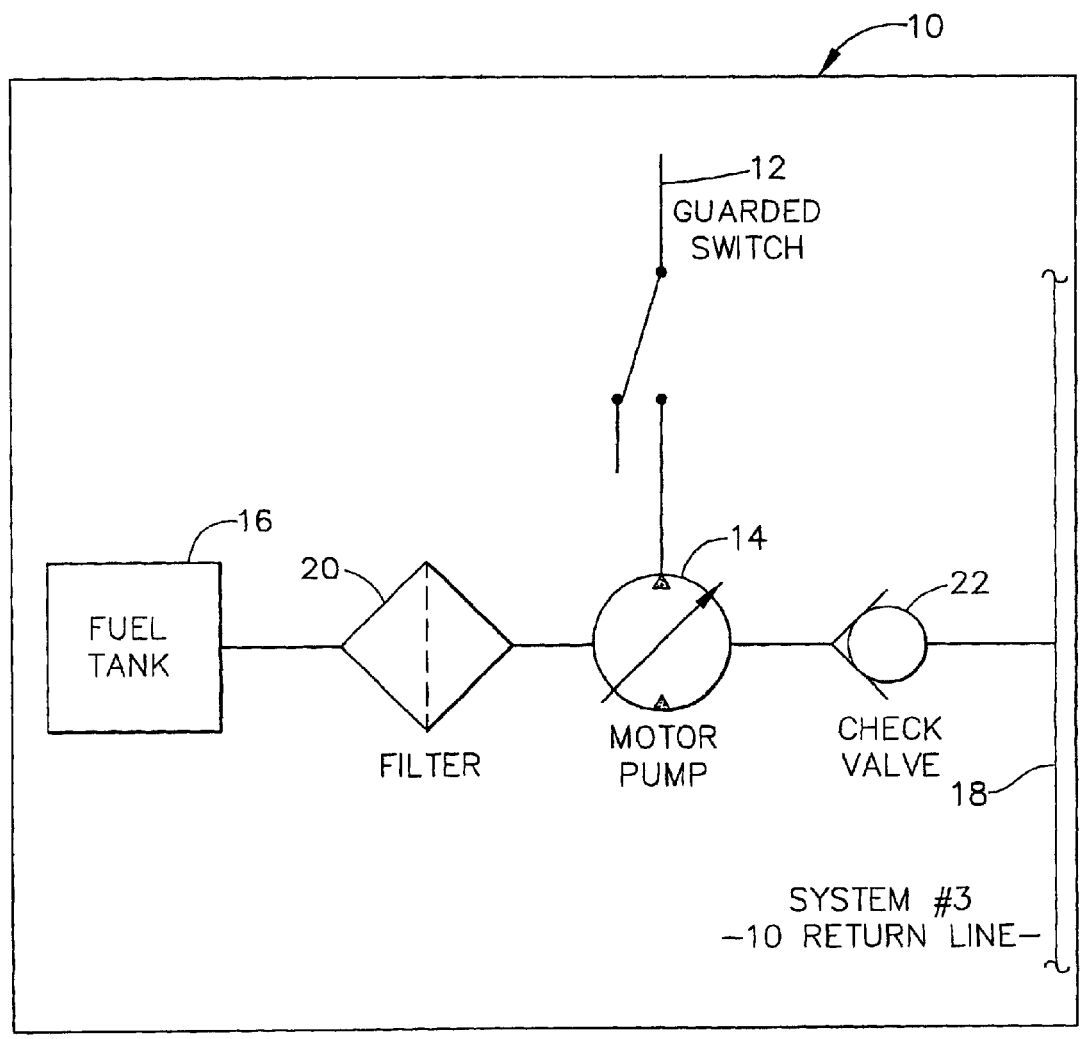

LAST CHANCE AIRCRAFT BACK-UP HYDRAULIC SYSTEM

BACKGROUND OF THE INVENTION

This invention relates to a dedicated, aircraft hydraulic system, and more particularly, to a last chance system which has the ability to supply additional fluid to the hydraulic system upon failure.

In aircraft hydraulic systems, most failures are caused by a rubbed through tube or worn seal in a hydraulic component. These failures drain the hydraulic system reservoir of all of the hydraulic fluid over a period of several minutes.

Hydraulic system reservoirs are designed with a finite amount of excess hydraulic fluid that can be measured in pints. Once the hydraulic fluid is depleted from the reservoir, the engine pump suction runs dry and the hydraulic pumps cavitate and fail.

Aircraft require hydraulic pressure to operate many systems during flight. Therefore, aircraft are designed with multiple or redundant hydraulic systems that act as back-up if one hydraulic system should fail. Multiple hydraulic systems failures have been reported in the past.

As can be seen, there is a need for an apparatus and method of providing one additional last source to maintain hydraulic system pressure in aircraft and the like and providing additional time to find and get to a safe landing site.

SUMMARY OF THE INVENTION

In one aspect of the invention, in an aircraft hydraulic system having a return line, the improvement comprises a back-up system to operate the hydraulic system in the event of a detected leak of fluid from the system, including a source of auxiliary fluid, a pump connected to the source of auxiliary fluid and the hydraulic system return line for supplying auxiliary fluid to the hydraulic system return line, and a switch for selectively operating the pump means.

In another aspect of the present invention, in an aircraft hydraulic system having a return line, the improvement comprises a back-up system to operate the hydraulic system in the event of a detected leak of fluid from the system, including a source of auxiliary fluid, a pump connected to the source of auxiliary fluid and the hydraulic system return line for supplying auxiliary fluid to the hydraulic system return line, a switch for selectively operating the pump, and a one-way check valve between the pump and return line for directing fluid from the auxiliary fluid source towards the return line, with the source of auxiliary fluid being a reservoir of aircraft fuel.

In yet a further aspect of the present invention, in an aircraft hydraulic system having a return line, the improvement comprises a back-up system to operate the hydraulic system in the event of a detected leak of fluid from the system, including a source of auxiliary fluid, a pump connected to the source of auxiliary fluid and to the hydraulic system return line for supplying auxiliary fluid to the hydraulic system return line, a switch for selectively operating the pump, and a one-way check valve between the pump and return line for directing fluid from the auxiliary source towards the return line, with the source of auxiliary fluid being potable water.

In a still further aspect of the present invention, a method of operating an aircraft hydraulic system in the event of failure of the system including the steps of providing a source of auxiliary fluid, pumping the source of auxiliary fluid into a hydraulic system line upon detecting a leak in the hydraulic system, and selectively controlling the pumping of the auxiliary fluid into the hydraulic system, while blocking the reverse flow of the pumped auxiliary fluid.

More specifically, a last chance back-up system to operate the failed hydraulic system is provided by the present invention which includes a source of auxiliary fluid such as a fuel reservoir, a pump connected to the reservoir and the hydraulic system return line for supplying fuel or auxiliary fluid to the hydraulic system return line, and a guarded switch for selectively operating the pump at the pilot's disposal.

The source of auxiliary fluid may be the aircraft fuel reservoir or a reservoir of potable water. A one-way check valve is provided between the pump and return line for directing fluid to the return line and preventing its return to the reservoir. A filter between the reservoir and pump can also be used to filter the fluid being directed to the return line, This additional amount of fluid may be sufficient to enable operation of the hydraulic system so the pilot can safely land the aircraft.

These and other features, aspects and advantages of the present invention will become better understood with reference to the following drawings, description, and claims.

BRIEF DESCRIPTION OF THE DRAWING

The SOLE FIGURE is a schematic view of the back-up hydraulic system of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

If a pilot determines that he has lost control of an aircraft due to a loss of hydraulic fluid pressure, the last chance back-up system of the present invention has the ability to supply additional fluid in the time of need. Every aircraft carries a large quantity of liquid fuel. Upon activation of a guarded switch by the pilot, a motor will be activated to pump liquid fuel from a fuel tank having gallons, rather than pints of fluid fuel, to the affected, depleted hydraulic reservoir to the largest diameter hydraulic system return line located as far as possible from the engine pumps. The fuel added into the hydraulic system will provide the necessary fluid requirements to the hydraulic system to maintain system stiffness and allow the engine pumps and actuators to operate once again as the return line, which is filled with hydraulic oil, will flow this oil column to the reservoir and pump suction ahead of the added fuel column added to the system by the pump activated by the pilot. This momentary extension of the hydraulic system is all that may be necessary for the pilot to safely land the aircraft, which would also be dependent on the size of the leak and the amount of fuel remaining in the tanks.

Referring to the drawing in detail, if a pilot determines that he has lost control of a vehicle, such as an aircraft, due to a loss of hydraulic fluid pressure, he can activate a guarded switch 12 of the last chance back-up hydraulic system 10 of the present invention, dedicated to each hydraulic reservoir in the aircraft.

Activation of the switch 12 can turn on a motor of pump 14 positioned between a fuel tank 16 and a failed hydraulic system return line 18 located as far as possible from the engine (or hydraulically driven component) pumps. The fuel from tank 16 can be pumped through a filter 20 by pump 14 and a one-way check valve 22 into the return line 18 upstream from any remaining hydraulic fluid in the return line. The return line, which may be filled with the remaining column of hydraulic oil or fluid, can flow the column of hydraulic fluid to the affected reservoir and pump section ahead of the column of fuel injected into the system 10 by the pilot. This momentary extension of the hydraulic system may be all that may be necessary for the pilot to safely land the aircraft.

The fuel and hydraulic oil are compatible with the seal material found in the pumps, motors and actuators used in aircraft. However, maintenance may be required after fuel has been added to the hydraulic system in an emergency situation, but should be less costly than the loss of an aircraft. The following would need to be repaired: the failure site, the effected systems would have to be purged of all fuel, the filters changed, and the pumps replaced. Fuel does not contain lubricants found in hydraulic oil and will effect pump life.

Further, potable water carried on the aircraft may be an alternative to the fuel provided in the system. Fuel and hydraulic oil may atomize through pinhole leaks in the hydraulic line, causing a potential explosive hazard, if an ignition source is close to possibly ignite the mixture.

It should be understood, of course, that the foregoing relates to preferred embodiments of the invention and that modifications may be made without departing from the spirit and scope of the invention as set forth in the following claims.

We claim:

1. In a hydraulic system having a return line, the improvement comprising:
    a back-up system to operate said hydraulic system in the event of a detected leak of fluid from said system, including:
    a source of auxiliary fluid;
    a pump connected to said source of auxiliary fluid and said hydraulic system return line for supplying auxiliary fluid to said hydraulic system return line;
    a switch for selectively operating said pump means; and
    wherein said auxiliary fluid is one selected from the group consisting of fuel, potable water and other compressible fluid found in large quantities on an aircraft.

2. In the back-up system of claim 1, further comprising:
    a one-way check valve between said pump and return line to prevent the flow of hydraulic fluid to the auxiliary fluid, thereby preventing contamination of the auxiliary fluid source under normal operating circumstances.

3. In the back-up system of claim 1, further including a fluid filter between said auxiliary fluid source and said pump.

4. In an aircraft hydraulic system having a return line, the improvement comprising:
    a back-up system to operate said hydraulic system in the event of a detected leak of fluid from said system, including:
    a source of auxiliary fluid;
    a pump connected to said source of auxiliary fluid and said hydraulic system return line for supplying auxiliary fluid to said hydraulic system return line;
    a switch for selectively operating said pump means; and
    a one-way check valve between said pump and return line for directing auxiliary fluid from said auxiliary fluid source towards said return line;
    said source of auxiliary fluid being a reservoir of aircraft fuel.

5. In the back-up system of claim 4, further including a fluid filter between said auxiliary fluid source and said pump.

6. In an aircraft hydraulic system having a return line, the improvement comprising:
    a back-up system to operate said hydraulic system in the event of a detected leak of fluid from said system, including:
    a source of auxiliary fluid;
    a pump connected to said source of auxiliary fluid and said hydraulic system return line for supplying auxiliary fluid to said hydraulic system return line;
    a switch for selectively operating said pump means; and
    a one-way check valve between said pump and return line for directing auxiliary fluid from said auxiliary source towards said return line;
    said source of auxiliary fluid being potable water.

7. In the back-up system of claim 6, further comprising:
    a fluid filter between said auxiliary fluid source and said pump.

8. A method of operating an aircraft hydraulic system in the event of failure of said system including the steps of:
    providing a source of auxiliary fluid;
    pumping said source of auxiliary fluid into said hydraulic system line upon detecting a leak in said hydraulic system;
    selectively controlling the pumping of the auxiliary fluid into said hydraulic system; and
    wherein said auxiliary fluid is one selected from the group consisting of fuel, potable water and other compressible fluid found in large quantities on an aircraft.

9. The method of claim 8, wherein said source of auxiliary fluid is contained in an aircraft's fuel tank.

10. The method of claim 9, further including the step of filtering said auxiliary fluid before pumping said fluid into the hydraulic system return line.

11. The method of claim 10, further including the step of providing a one way check valve to prevent the flow of hydraulic fluid into said auxiliary fluid.

* * * * *